US012674760B2

(12) United States Patent
Hosomi

(10) Patent No.: US 12,674,760 B2
(45) Date of Patent: Jul. 7, 2026

(54) OPTICAL APPARATUS AND FOCUS CORRECTION METHOD

(71) Applicant: Lasertec Corporation, Kanagawa (JP)

(72) Inventor: Minoru Hosomi, Yokohama (JP)

(73) Assignee: LASERTEC CORPORATION, Yokohama (JP)

( * ) Notice: Subject to any disclaimer, the term of this patent is extended or adjusted under 35 U.S.C. 154(b) by 183 days.

(21) Appl. No.: 18/581,794

(22) Filed: Feb. 20, 2024

(65) Prior Publication Data

US 2024/0280502 A1 Aug. 22, 2024

(30) Foreign Application Priority Data

Feb. 21, 2023 (JP) ................................. 2023-024792

(51) Int. Cl.
*G01N 21/88* (2006.01)

(52) U.S. Cl.
CPC ..... *G01N 21/8806* (2013.01); *G01N 21/8851* (2013.01); *G01N 2201/06113* (2013.01); *G01N 2201/0636* (2013.01); *G01N 2201/12753* (2013.01)

(58) Field of Classification Search
CPC ........... G01N 21/8806; G01N 21/8851; G01N 2201/06113; G01N 2201/0636; G01N 2201/12753; G01N 21/93; G01N 2015/1452; G01N 21/274; G11B 7/0908; G03F 7/706; G03F 7/70641; G03F 7/70258; G02B 7/28
See application file for complete search history.

(56) References Cited

U.S. PATENT DOCUMENTS

| | | | |
|---|---|---|---|
| 6,549,270 B1 | 4/2003 | Ota | |
| 2013/0050668 A1* | 2/2013 | Kisteman | G03F 7/70625 |
| | | | 355/55 |
| 2014/0327906 A1* | 11/2014 | Kafry | G01N 21/8806 |
| | | | 356/244 |
| 2014/0340664 A1 | 11/2014 | Bleidistel et al. | |
| 2017/0256045 A1* | 9/2017 | Miyai | G06T 7/0004 |

(Continued)

FOREIGN PATENT DOCUMENTS

| | | |
|---|---|---|
| JP | 2000-286189 A | 10/2000 |
| JP | 2008-130850 A | 6/2008 |

(Continued)

*Primary Examiner* — Georgia Y Epps
*Assistant Examiner* — Erin R Garber
(74) *Attorney, Agent, or Firm* — ALSTON & BIRD LLP

(57) ABSTRACT

An optical apparatus according to the present embodiment includes a detector for detecting detection light of illumination light reflected by a sample, an optical system for illuminating the sample with the illumination light and guiding the detection light reflected by the sample to the detector, a displacement measurement unit for measuring a displacement drift indicating the amount of drift in the position of an optical element included in the optical system, a storage unit for storing the correlation between the displacement drift and a focus drift indicating the amount of drift in the distance between the sample and the optical system when the detection light detected by the detector is brought into focus, and a prediction unit for predicting a focus drift from the measured displacement drift by using the correlation.

10 Claims, 7 Drawing Sheets

(56)          References Cited

U.S. PATENT DOCUMENTS

2020/0314351 A1 *  10/2020  Bott ........................ H04N 23/69
2021/0211573 A1 *   7/2021  Yamaguchi ............ H04N 23/75
2022/0187715 A1 *   6/2022  Akhssay ................. G03F 7/706
2023/0152241 A1 *   5/2023  Moellmann ........ G01N 21/8806
                                                              356/237.5

FOREIGN PATENT DOCUMENTS

JP          2015-512145  A     4/2015
WO      WO 2013/113480  A1     8/2013

* cited by examiner

OPTICAL APPARATUS AND FOCUS CORRECTION METHOD

INCORPORATION BY REFERENCE

This application is based upon and claims the benefit of priority from Japanese patent application No. 2023-024792, filed on Feb. 21, 2023, the disclosure of which is incorporated herein in its entirety by reference.

BACKGROUND

The present disclosure relates to an optical apparatus and a focus correction method.

Published Japanese Translation of PCT International Publication for Patent Application, No. 2015-512145 discloses a measurement system in which measurement light is transmitted through an optical element including a lens and the like, and reflected light from a mirror attached on the opposite side to an incident direction is detected with a camera such as a CCD. In the measurement system of Published Japanese Translation of PCT International Publication for Patent Application, No. 2015-512145, when an optical path inside the optical element changes due to expansion of the lens, an interference pattern to be recorded by the camera changes. Therefore, the change in shape of the mirror is derived based on the change of the interference pattern, and the position of the optical element is adjusted using a manipulator.

Japanese Unexamined Patent Application Publication No. 2008-130850 and Japanese Unexamined Patent Application Publication No. 2000-286189 disclose EUV exposure apparatuses that measure a change in mirror spacing caused by a thermal load with a distance sensor and adjust the mirror spacing based on the measurement result.

The distance sensor disclosed in Japanese Unexamined Patent Application Publication No. 2008-130850 uses a laser interferometer and a capacitance sensor, and adjusts the position of a mirror installed in a lens barrel by using an actuator such as a piezo element.

SUMMARY

For example, in a defect inspection apparatus using EUV light as illumination light for illuminating a sample such as an EUV mask, defocusing occurs due to thermal expansion caused by a temperature change within 1° C. because the depth of focus is shallow. Images containing such focus drifts have a problem in that they are blurred and detected as pseudo defects.

The present disclosure has been made in view of such problems, and provides an optical apparatus and a focus correction method that can enhance matching of focus.

An optical apparatus according to one aspect of the present embodiment includes: a detector configured to detect reflected light of illumination light reflected by a sample; an optical system configured to illuminate the sample with the illumination light and guiding the reflected light reflected by the sample to the detector; a displacement measurement unit configured to measure a displacement drift indicating an amount of drift in position of an optical element included in the optical system; a storage unit configured to store a correlation between the displacement drift and a focus drift indicating an amount of drift in distance between the sample and the optical system when the reflected light detected by the detector is brought into focus; and a prediction unit configured to predict the focus drift from the measured displacement drift by using the correlation.

In the above optical apparatus, the displacement drift may indicate the amount of drift of the optical element from a reference position, and the focus drift may indicate the amount of drift from a reference distance serving as a reference between the sample and the optical system.

In the above optical apparatus, the displacement measurement unit may include: a mirror fixed to the optical element; a laser configured to emit laser light; and an interferometer configured to detect a position of the mirror from interference between the laser light emitted to the mirror and the laser light reflected by the mirror.

In the optical apparatus, the optical system may include a Schwarzschild optical system having a concave mirror and a convex mirror, the convex mirror may be fixed to a holder including a first member extending in a first direction parallel to an optical axis of the convex mirror and a second member extending in a second direction perpendicular to the optical axis, the mirror may be fixed to the optical element via the second member, and the displacement measurement unit may measure the position from interference between laser light emitted along the second direction and the laser light reflected in a direction opposite to the second direction by the mirror.

The optical apparatus may further include a control unit configured to control a distance between the sample and the optical system, in which the control unit may control the distance based on the focus drift predicted by the prediction unit.

A focus correction method according to one aspect of the present embodiment is a focus correction method for an optical apparatus including a detector configured to detect reflected light of illumination light reflected by a sample, and an optical system configured to illuminate the sample with illumination light and guiding the reflected light reflected by the sample to the detector, includes the steps of: storing a correlation between a displacement drift indicating an amount of drift in position of an optical element included in the optical system, and a focus drift indicating an amount of drift in distance between the sample and the optical system when the reflected light detected by the detector is brought into focus, measuring the displacement drift; and predicting the focus drift from the measured displacement drift by using the correlation.

In the focus correction method, the displacement drift may indicate the amount of drift of the optical element from a reference position, and the focus drift may indicate the amount of drift from a reference distance serving as a reference between the sample and the optical system.

In the focus correction method, the optical apparatus may further include a displacement measurement unit, the displacement measurement unit may include a mirror fixed to the optical element, a laser configured to emit laser light, and an interferometer configured to detect a position of the mirror from interference between the laser light emitted to the mirror and the laser light reflected by the mirror, and in the step of measuring the displacement drift, the displacement drift may be measured by detecting a position of the mirror from interference between the laser light emitted to the mirror and the laser light reflected by the mirror.

In the focus correction method, the optical system may include a Schwarzschild optical system having a concave mirror and a convex mirror, the convex mirror may be fixed to a support member including a first member extending in a first direction parallel to an optical axis of the convex mirror and a second member extending in a second direction perpendicular to the optical axis, the mirror may be fixed to the optical element via the second member, and in the step of measuring the displacement drift, the position may be measured from interference between laser light emitted along the second direction and the laser light reflected in a direction opposite to the second direction by the mirror.

The focus correction method may further include a step of controlling the distance based on the focus drift predicted in the step of predicting the focus drift.

According to the present disclosure, it is possible to provide an optical apparatus and a focus correction method that can enhance matching of focus.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Embodiments of the present disclosure will be described below with reference to the drawings. The following description shows preferred embodiments of the present disclosure, and the scope of the present disclosure is not limited to the following embodiments. In the following description, the same reference signs designate substantially the same contents.

First Embodiment

An optical apparatus according to a first embodiment will be described. The optical apparatus according to the present embodiment is, for example, an inspection apparatus that illuminates a sample such as an EUV mask with illumination light such as EUV light to inspect the sample. Note that the optical apparatus is not limited to the inspection apparatus, but may be any other optical apparatuses such as an exposure apparatus as long as it has an optical system for illuminating a sample with illumination light. Further, the sample is not limited to an EUV mask as long as it is an object to be illuminated with illumination light.

Figure 1:
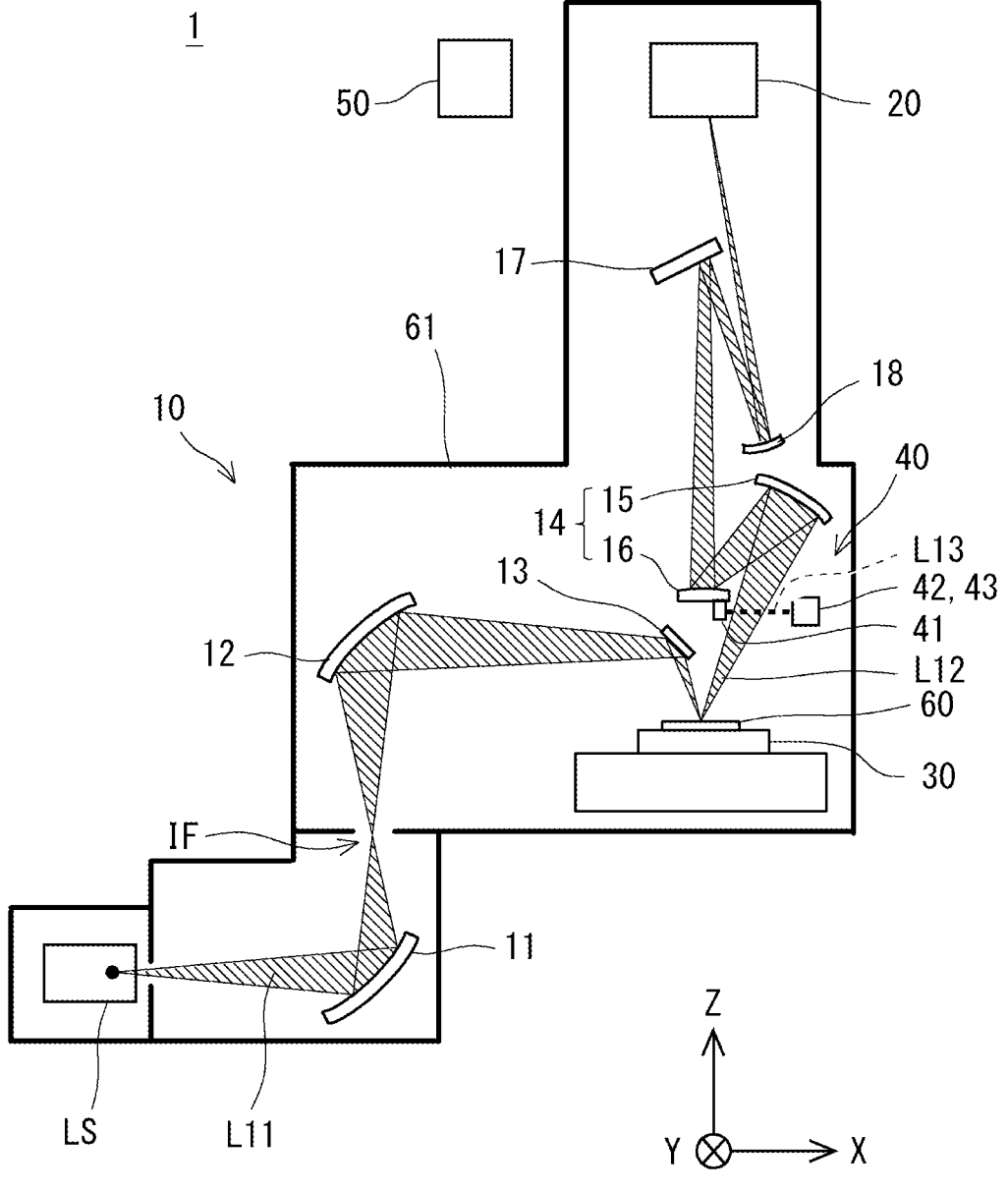
FIG. 1 is a configuration diagram illustrating an inspection apparatus according to a first embodiment.

FIG. 1 is a configuration diagram illustrating the inspection apparatus according to the first embodiment. As shown in FIG. 1, the inspection apparatus 1 includes a light source LS, an optical system 10, a detector 20, a stage 30, a displacement measurement unit 40, and a processing apparatus 50.

The light source LS generates illumination light L11 including EUV light. Here, the light source LS generates EUV light of 13.5 nm which is the same as an exposure wavelength for the sample 60 as an illumination target. The light source LS is, for example, a DPP (Discharge Produced Plasma) light source using discharge. Note that the illumination light L11 generated by the light source LS is not limited to light including EUV light, but may also include light of other wavelengths such as UV (Ultra Violet) light, white light, and infrared light. The light source LS may be arranged inside a chamber 61.

The optical system 10 illuminates the sample 60 with illumination light L11 and guides the reflected light reflected by the sample 60 to the detector 20. The optical system 10 includes optical elements and propagates the illumination light L11 such as EUV light. The optical system 10 includes a concave mirror 11, a concave mirror 12, a drop-in mirror 13, a Schwarzschild optical system 14, a plane mirror 17, and a concave mirror 18 as the optical elements. The Schwarzschild optical system 14 has a concave mirror 15 and a convex mirror 16. In addition to these elements, the optical system 10 may include other optical elements such as lenses and mirrors. Each optical element may be provided inside the chamber 61. The optical system 10 serves a bright field optical system for imaging the sample 60. Note that the optical system 10 may be a dark field optical system for imaging the sample 60.

The optical system 10 for guiding the illumination light L11 such as EUV light will be described. The illumination light L11 generated by the light source LS travels while spreading. The illumination light L11 emitted from the light source LS is reflected by the concave mirror 11. The concave mirror 11 is, for example, an ellipsoidal mirror. The concave mirror 11 is configured as a multilayer mirror in which Mo films and Si films are alternately laminated, and reflects EUV light. The illumination light L11 reflected by the concave mirror 11 travels while being narrowed down. After the illumination light L11 focuses on a focal point IF, it travels while spreading. Thereafter, the illumination light L11 is reflected by the concave mirror 12.

The concave mirror 12 is, for example, an ellipsoidal mirror. The concave mirror 12 is a multilayer mirror in which Mo films and Si films are alternately laminated, and reflects EUV light. The illumination light L11 reflected by the concave mirror 12 travels while being narrowed down, and is incident to the drop-in mirror 13. The drop-in mirror 13 is a plane mirror and is placed above the sample 60. The illumination light L11 reflected by the drop-in mirror 13 is incident to the sample 60. The drop-in mirror 13 focuses the illumination light L11 onto the sample 60. In this way, an inspection area of the sample 60 is illuminated with the illumination light L11 which is EUV light. The sample 60 is placed on the stage 30.

Here, for convenience of explanation of the inspection apparatus 1, an XYZ orthogonal coordinate axis system is introduced. A direction perpendicular to the top surface of the stage 30 is defined as a Z-axis direction, and a plane parallel to the top surface of the stage 30 is defined as an XY plane. A direction parallel to the XY plane is referred to as an in-plane direction. For example, an X-axis direction and a Y-axis direction are in-plane directions.

The stage 30 is a drive stage such as an XYZ stage. The stage 30 moves within the XY plane perpendicular to an optical axis and in a Z-axis direction parallel to the optical axis. As a result, the sample 60 moves within the XY plane and in the Z-axis direction. Since the illumination position of the sample 60 changes, it is possible to observe any position on the sample 60. Furthermore, the inspection area in which the sample 60 is illuminated can be changed.

As described above, the illumination light L11 illuminates the inspection area of the sample 60. Reflected light reflected by the sample 60 is defined as detection light L12. The detection light L12 includes EUV light reflected by the sample 60. The detection light L12 reflected by the sample 60 is incident to the Schwarzschild optical system 14. Specifically, the detection light L12 reflected by the sample 60 is incident to the concave mirror 15. The detection light L12 reflected by the concave mirror 15 is incident to the convex mirror 16. The convex mirror 16 reflects the detection light L12 from the concave mirror 15 toward the plane mirror 17. The detection light L12 reflected by the plane mirror 17 is reflected by the concave mirror 18, and then incident to the detector 20. The inspection area of the sample 60 is enlarged and projected onto the detector 20 by the Schwarzschild optical system 14, the plane mirror 17, the concave mirror 18, and the like.

The detection light L12 is detected by the detector 20. The detector 20 detects the detection light L12 that corresponds to the illumination light L11 reflected by the sample 60. The detector 20 is an imaging apparatus such as a charge coupled device (CCD) sensor, a complementary metal oxide semiconductor (CMOS) sensor, or a time delay integration (TDI) sensor, and images the sample 60. In other words, the detector 20 captures an enlarged image of the inspection area of the sample 60.

Figure 2:
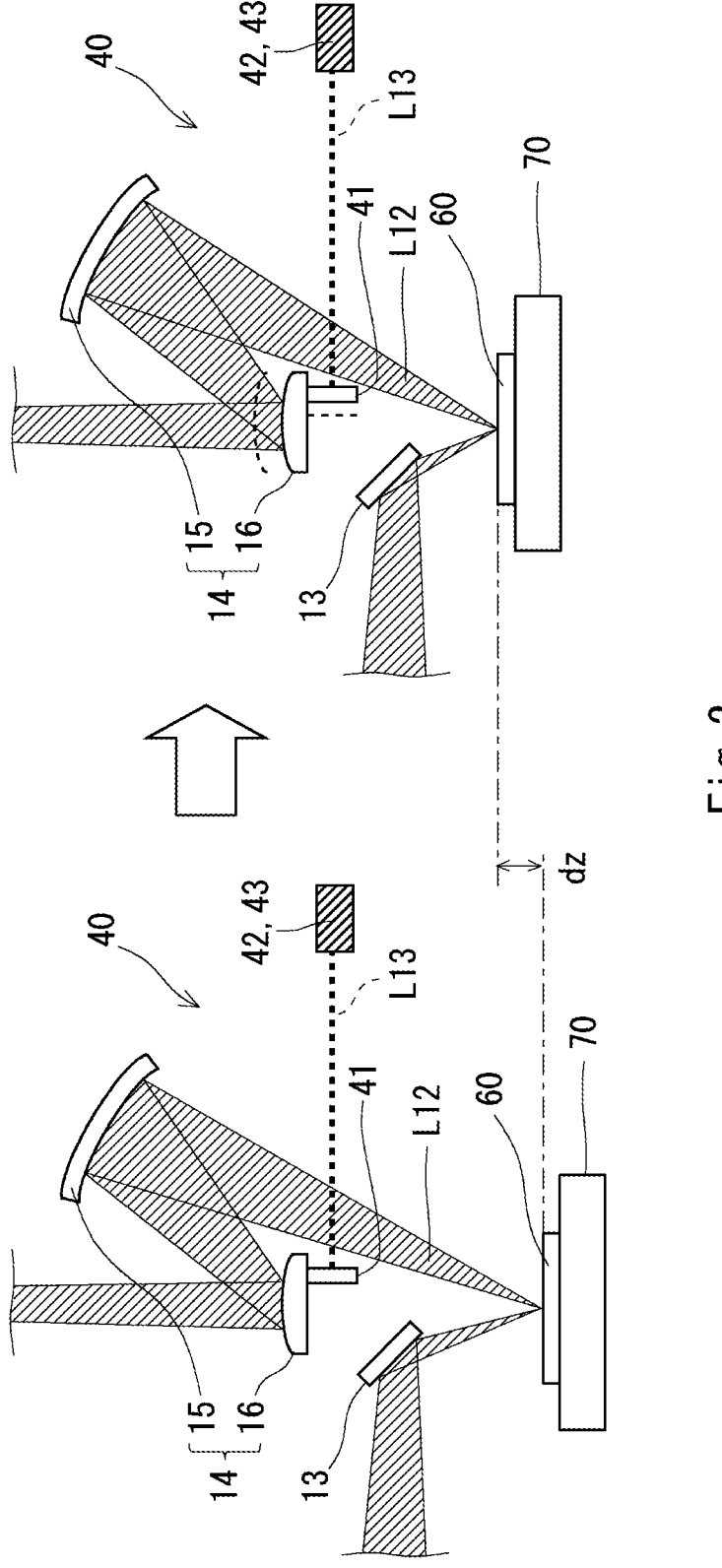
FIG. 2 is a configuration diagram illustrating a displacement measurement unit before and after displacement of an optical element in the inspection apparatus according to the first embodiment.
Figure 3:
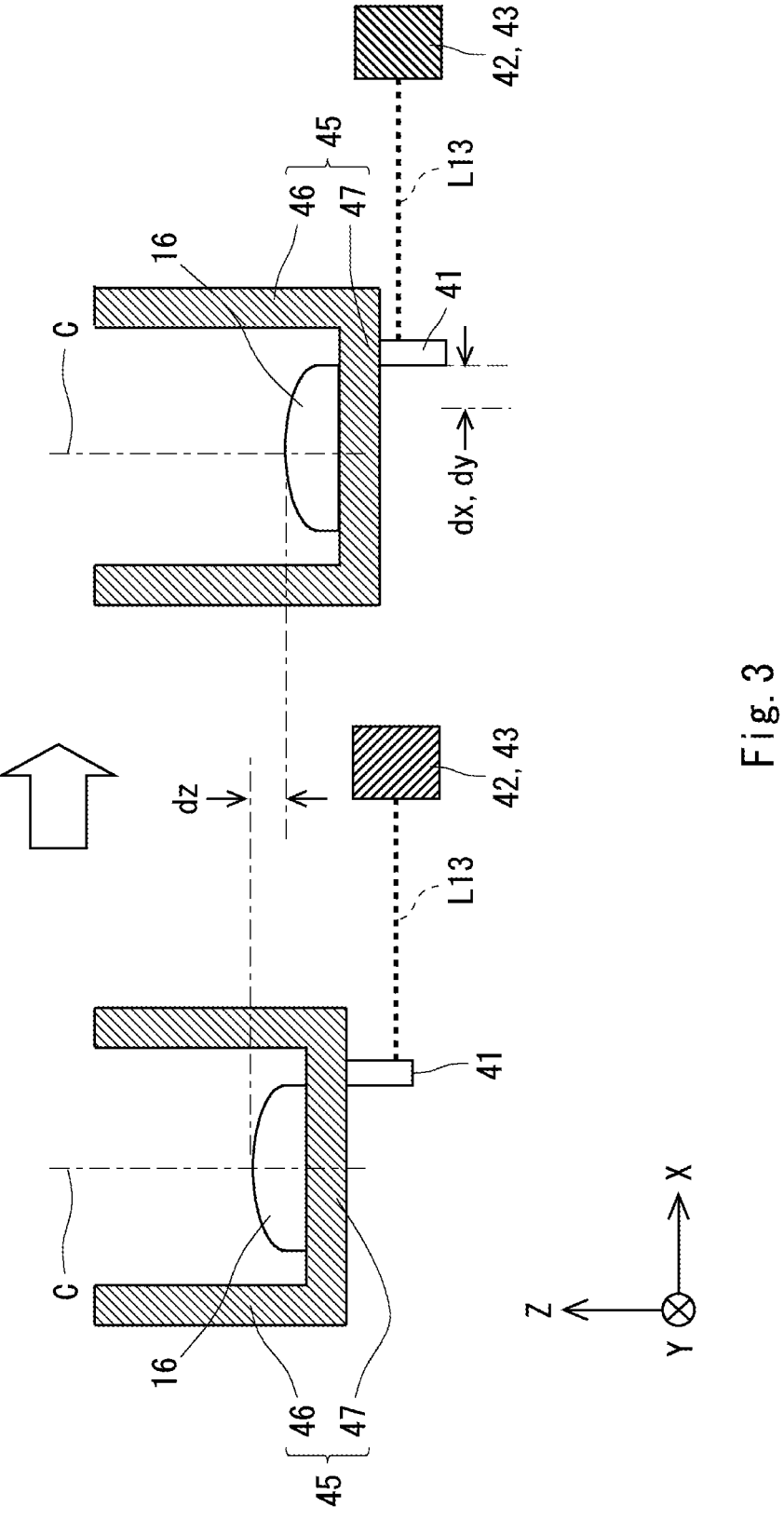
FIG. 3 is a configuration diagram illustrating the displacement measurement unit before and after displacement of the optical element in the inspection apparatus according to the first embodiment.

The displacement measurement unit 40 measures a displacement drift indicating the amount of drift in the position of an optical element included in the optical system 10. FIGS. 2 and 3 are configuration diagrams illustrating the displacement measurement unit 40 before and after displacement of the optical element in the inspection apparatus 1 according to the first embodiment. In FIGS. 2 and 3, the left side shows the optical elements and the displacement measurement unit 40 before displacement, and the right side shows the optical element and the displacement measurement unit 40 after displacement. As shown in FIGS. 1 to 3, the displacement measurement unit 40 includes a mirror 41, a laser 42, and an interferometer 43.

The mirror 41 is fixed to the optical element. For example, the mirror 41 is fixed to the convex mirror 16. Note that the mirror 41 may be fixed to the convex mirror 16 via a holder 45 for supporting the convex mirror 16.

The holder 45 includes a first member 46 and a second member 47. The first member 46 extends in the Z-axis direction parallel to an optical axis C of the convex mirror 16. The second member 47 extends in an in-plane direction (for example, the X-axis direction or the Y-axis direction) perpendicular to the optical axis C. The convex mirror 16 is fixed to the holder 45. The mirror 41 is fixed to convex mirror 16 via the second member 47 of the holder 45. Note that it is preferable that the first member 46 and the second member 47 include materials having the same coefficient of thermal expansion. For example, the first member 46 and the second member 47 preferably include the same material. Moreover, it is preferable that the first member 46 and the second member 47 have the same thickness. Further, the length in the Z-axis direction of the first member 46 and the length in the in-plane direction of the second member 47 are preferably approximately the same.

The laser 42 emits laser light L13. Specifically, the laser 42 emits laser light L13 to the mirror 41. The interferometer 43 detects the position of the mirror 41 based on the interference between the laser light L13 emitted to the mirror 41 and the laser light L13 reflected by the mirror 41. As a result, the displacement measurement unit 40 measures the position of the convex mirror 16 based on the interference between the laser light L13 emitted along the in-plane direction perpendicular to the optical axis C and the laser light L13 reflected by the mirror 41 in the opposite direction to the in-plane direction.

The displacement drift indicating the amount of drift in the position of the optical element indicates the amount of drift of the optical element from a reference position. For example, the reference position may be set to a predetermined position of the optical element when the detection light L12 detected by the detector 20 is brought into focus. Alternatively, the reference position may be set to the position of the optical element when a reference sample is illuminated with the illumination light L11 and the detection light L12 detected by the detector 20 is brought into focus. Alternatively, the reference position may be set to the position of the optical element when the detection light L12 detected by the detector 20 is brought into focus while the inspection apparatus 1 is at a predetermined temperature.

Due to the propagation of the illumination light L11 such as EUV light and the detection light L12, portions where the density of EUV light increases such as the periphery of the convex mirror 16 are heated. As a result, the temperature around the convex mirror 16 increases. Therefore, due to such a temperature rise, thermal expansion occurs in the convex mirror 16, the holder 45, etc., and the position of the convex mirror 16 changes. In other words, the position of the convex mirror 16 drifts. As a result, the focus position of the detection light L12 detected by the detector 20 drifts. Specifically, as the holder 45 of the convex mirror 16 thermally expands due to temperature rise, the relative distance between the concave mirror 15 and the convex mirror 16 changes, so that the distance between the sample 60 and the optical system 10 changes, which causes the focus position to drift.

The amount of drift in the distance between the sample 60 and the optical system 10 when the detection light L12 detected by the detector 20 is brought into focus as described above is referred to as the focus drift. The focus drift indicates the amount of drift from a reference distance serving as a reference between the sample 60 and the optical system 10. For example, the reference distance may be set to the distance between the sample 60 and the optical system 10 when the optical element is located at the reference position and the detection light L12 detected by the detector 20 is brought into focus. Alternatively, the reference distance may be set to the distance between the sample 60 and the optical system 10 when the reference sample is illuminated with the illumination light L11 and the detection light L12 detected by the detector 20 is brought into focus. Alternatively, the reference distance may be set to the distance between the sample 60 and the optical system 10 when the detection light L12 detected by the detector 20 is brought into focus while the inspection apparatus 1 is at a predetermined temperature.

The inspection apparatus 1 of the present embodiment measures the displacement drift of the convex mirror 16 caused by thermal expansion in the in-plane direction of the holder 45 by using the mirror 41 attached to the lower part of the holder 45. From a measurement result, the processing apparatus 50 predicts the focus drift when the detection light L12 is focused on the detector 20.

Here, the thermal expansion around the convex mirror 16 is considered to be isotropic. Therefore, the amount of thermal expansion in the Z-axis direction which is the optical axis C direction (focus direction) can be predicted from the amount of thermal expansion in the in-plane direction (for example, the X-axis direction and the Y-axis direction) of the holder 45. Therefore, the focus drift when the detection light L12 is focused can be predicted from the displacement drift in the in-plane direction of the holder 45. The distance in the focus direction between the sample 60 and the optical system 10 is adjusted according to the predicted focus drift. For example, the position of the sample 60 on the stage 30 is adjusted by moving the stage 30, which makes it possible for the detector 20 to capture an image with suppressed blur. Note that when the distance in the focus direction between the sample 60 and the optical system 10 is adjusted, the optical system 10 may be moved instead of moving the stage 30.

Although the displacement drift of the convex mirror 16 is used as the displacement drift of the optical element, the present disclosure is not limited to this style, the displacement drifts of other optical elements such as the concave mirror 15 and the drop-in mirror 13 may be used. Further, although the mirror 41, the laser 42, and the interferometer 43 are used as the displacement measurement unit 40 for measuring the displacement drift of the optical element, the present disclosure is not limited to this style, and a distance sensor or the like may be used to measure the displacement drift of the optical element.

Furthermore, when the displacement drift of the optical element is measured, the measurement is not limited to the displacement drift in the in-plane direction, but may also be performed on the displacement drift in the Z-axis direction. However, the convex mirror 16 in the Schwarzschild optical system 14 is smaller than the concave mirror 15. Further, the upper side of the convex mirror 16 is covered by the concave mirror 15. The lower side of the convex mirror 16 is occupied by the sample 60. Therefore, it is difficult to secure a space for measuring the displacement drift in the Z-axis direction of the convex mirror 16 which undergoes a large temperature change. Therefore, in the present embodiment, by utilizing the fact that the thermal expansion of the holder 45 is isotropic, the thermal expansion in the Z-axis direction is converted to the thermal expansion in the in-plane direction. Therefore, it is possible to measure the displacement drift of the convex mirror 16 which undergoes a large temperature change, so that the positioning for focusing can be enhanced. The same as in the case of the convex mirror 16 can apply to the drop-in mirror 13.

An image of the sample 60 captured by the detector 20 is output to the processing apparatus 50. The processing apparatus 50 is an arithmetic processing apparatus having a processor, a memory, etc., and performs an inspection based on the image of the sample 60. The processing apparatus 50 may be, for example, an information processing apparatus such as a personal computer (PC) or a server.

Figure 4:
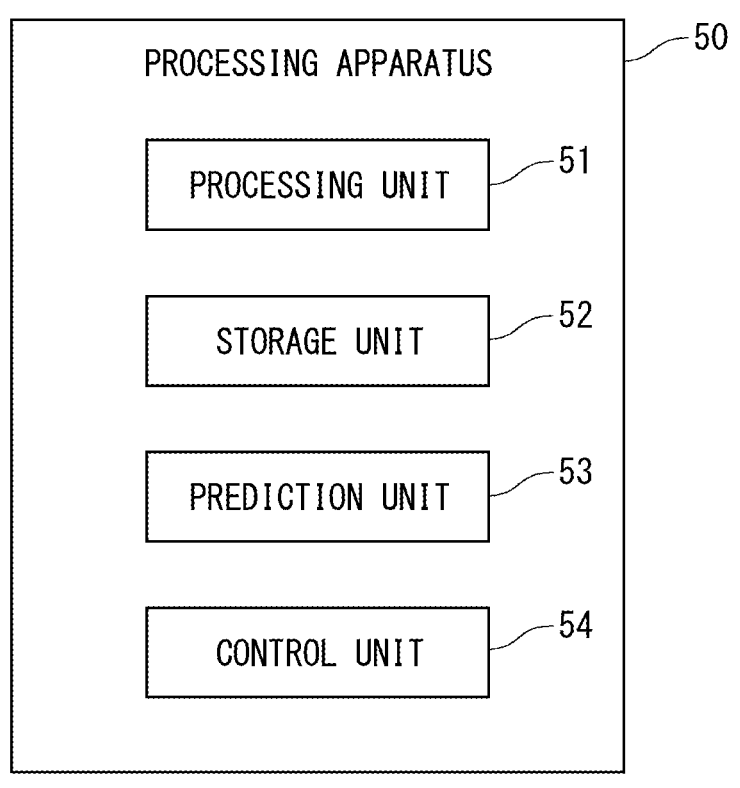
FIG. 4 is a block diagram illustrating a processing apparatus in the inspection apparatus according to the first embodiment.

FIG. 4 is a block diagram illustrating the processing apparatus 50 in the inspection apparatus 1 according to the first embodiment. As shown in FIG. 4, the processing apparatus 50 includes a processing unit 51, a storage unit 52, a prediction unit 53, and a control unit 54.

The processing unit 51 performs image processing. The processing unit 51 performs defect inspection by comparing the brightness of the image of the sample 60 with a threshold value. Furthermore, the processing unit 51 associates the coordinates of the stage 30 with the image, whereby defect coordinates of the sample 60 can be specified. Furthermore, the processing unit 51 displays images of defects and the like on a monitor, which allows a user to confirm defects.

The storage unit 52 stores defect coordinates and defect images. Furthermore, the storage unit 52 stores the position of the optical element and the displacement drift measured by the displacement measurement unit 40. Furthermore, the storage unit 52 stores the distance between the sample 60 and the optical system 10 and the focus drift when the detection light L12 detected by the detector 20 is brought into focus. The storage unit 52 stores the correlation between the displacement drift and the focus drift.

Figure 5:
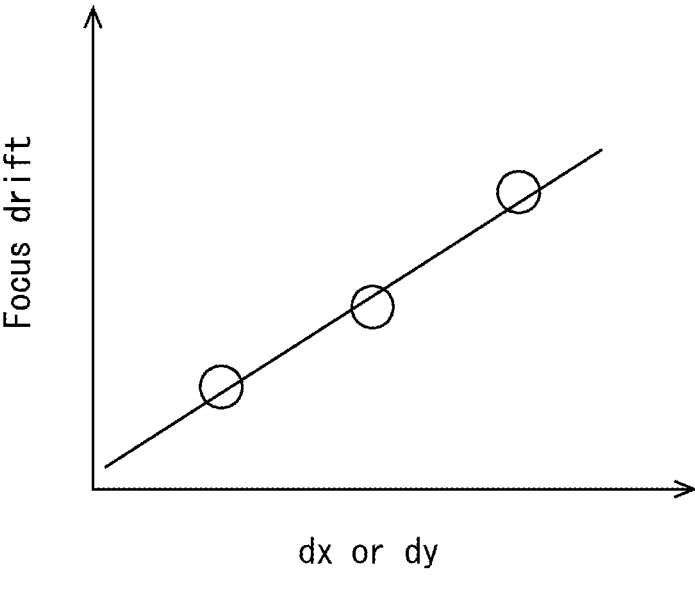
FIG. 5 is a graph illustrating the correlation between a displacement drift and a focus drift in the inspection apparatus according to the first embodiment, where the horizontal axis represents a displacement drift dx, dy in an in-plane direction such as an X-axis direction or a Y-axis direction, and the vertical axis represents a focus drift.

FIG. 5 is a graph illustrating the correlation between the displacement drift and the focus drift in the inspection apparatus 1 according to the first embodiment, where the horizontal axis represents the displacement drift dx, dy in an in-plane direction such as the X-axis direction or the Y-axis direction and the vertical axis represents the focus drift. As shown in FIG. 5, for example, the storage unit 52 stores the approximate expression of the following equation (1) and/or (2) as the correlation between the displacement drift and the focus drift.

$$\text{(Focus drift)} = (k \cdot dx) \tag{1}$$

$$\text{(Focus drift)} = (k \cdot dy) \tag{2}$$

The storage unit 52 may store linear approximate expressions of the above equations (1) and (2) as correlations, or may store other approximate expressions such as quadratic equations. Furthermore, the storage unit 52 may store a table in which a plurality of displacement drifts and a plurality of focus drifts are associated with each other as correlation. The prediction unit 53 predicts the focus drift by using correlation from the displacement drift measured by the displacement measurement unit 40.

The control unit 54 controls the distance between the sample 60 and the optical system 10. For example, the control unit 54 controls driving of the stage 30. As a result, the control unit 54 controls the distance between the sample 60 and the optical system 10 based on the focus drift predicted by the prediction unit 53. Note that the control unit 54 may control the distance between the sample 60 and the optical system 10 by moving the stage 30, or may control the distance between the sample 60 and the optical system 10 by moving the optical system 10.

Figure 6:
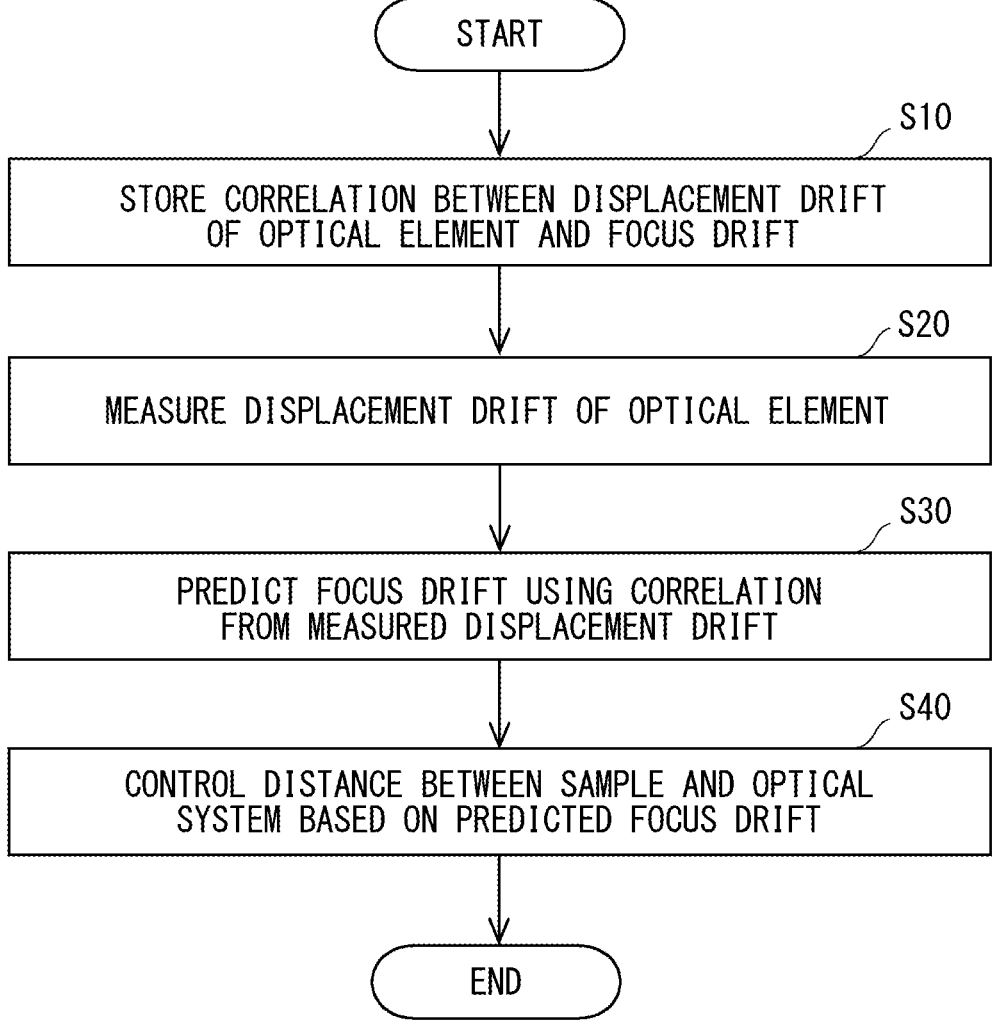
FIG. 6 is a flowchart illustrating a focus correction method according to the first embodiment.

Next, a focus correction method of the present embodiment will be described. The focus correction method of the present embodiment is a focus correction method for the inspection apparatus 1. FIG. 6 is a flowchart illustrating the focus correction method according to the first embodiment. As shown in step S10 in FIG. 6, the correlation between the displacement drift of the optical element included in the optical system 10 and the focus drift is first caused to be stored. For example, the correlation is stored in the storage unit 52.

Figure 7:
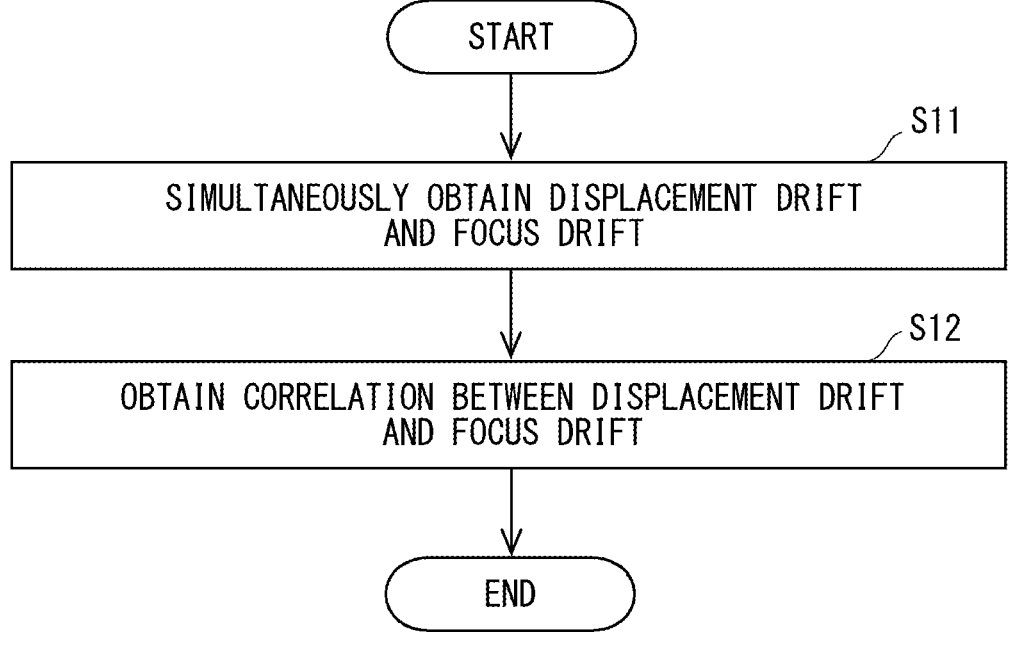
FIG. 7 is a flowchart illustrating a method of obtaining the correlation between a displacement drift of the optical element and a focus drift in the focus correction method according to the first embodiment.

FIG. 7 is a flowchart illustrating a method for obtaining the correlation between the displacement drift of the optical element and the focus drift in the focus correction method according to the first embodiment. As shown in step S11 in FIG. 7, the displacement drift of the optical element and the focus drift are simultaneously obtained. First, the displacement of the position of the optical element is measured. For example, the displacement measurement unit 40 is caused to measure the displacement of the position of the optical element, and caused to obtain the focus drift at that time. For example, when the position of the optical element changes, the control unit 54 is caused to move the stage 30 such that an image detected by the detector 20 is brought into focus. From the position of the stage 30 at this time, the best focus position when the position of the optical element changes is obtained.

When the position of the optical element changes to a plurality of positions, each displacement at each position is measured. The best focus position at each displacement is obtained. By obtaining a plurality of best focus positions at a plurality of positions as described above, it is possible to enhance the accuracy of the correlation. The processing unit 51 is caused to calculate the displacement drift of each displacement using a predetermined position of the optical element as a reference position, and also caused to calculate the focus drift at each best focus position by using the distance between the sample 60 and the optical system 10 at a predetermined focus position as a reference distance.

Next, as shown in step S12, the correlation between the displacement drift of the optical element and the focus drift is obtained. For example, the processing unit 51 is caused to apply fitting to such a graph as shown in FIG. 5, thereby obtaining an approximate expression. Note that the processing unit 51 may be caused to create a table instead of the approximate expression. In this way, the correlation between the displacement drift of the optical element and the focus drift is obtained.

Next, as shown in step S20 in FIG. 6, the displacement drift of the optical element is measured. For example, when the displacement drift of the optical element is measured, the displacement drift of the optical element may be measured by detecting the position of the mirror 41 from the interference between the laser light L13 emitted to the mirror 41 in the displacement measurement unit 40 and the laser light L13 reflected by the mirror 41.

Further, when the optical system 10 includes the Schwarzschild optical system 14 having the concave mirror 15 and the convex mirror 16, the convex mirror 16 may be fixed to the holder 45 including a first member 46 extending in the Z-axis direction parallel to the optical axis and the second member 47 extending in the X-axis direction or the Y-axis direction which is perpendicular to the optical axis. In that case, the mirror 41 may be fixed to the optical element via the second member 47. The position of the optical element may be measured from the interference between the laser light L13 irradiated from the in-plane direction including the X-axis direction or the Y-axis direction and the laser light L13 reflected in the opposite direction by the mirror 41.

Next, as shown in step S30, the focus drift is predicted from the measured displacement drift by using the correlation.

As shown in step S40, the distance between the sample 60 and the optical system 10 may be controlled based on the focus drift predicted in step S30 for predicting the focus drift. Specifically, the control unit 54 controls the distance between the sample 60 and the optical system 10 by moving the stage 30 on which the sample 60 is placed.

Next, an effect of the present embodiment will be described. The inspection apparatus 1 of the present embodiment causes the storage unit 52 to store in advance the correlation between the displacement drift of the optical element and the focus drift, and predicts the focus drift by using the correlation from the displacement drift of the optical element displaced due to temperature rise. Therefore, it is possible to enhance matching of focus. Furthermore, since the correlation is stored in advance, focusing can be quickly matched.

Further, the inspection apparatus 1 includes the displacement measurement unit 40 for measuring the displacement drift of the optical element, so that it is possible to quickly respond to environmental changes such as temperature rise. Since the displacement measurement unit 40 includes the interferometer 43, it is possible to measure the displacement drift of the optical element with high precision. Further, the displacement measurement unit 40 measures the displacement drift of the convex mirror 16 of the Schwarzschild optical system 14. Therefore, since the displacement drift of the optical element with a large temperature change on which the detection light L12 is concentrated is measured, it is possible to enhance the prediction accuracy of the focus drift.

Further, the displacement measurement unit 40 measures displacement drift using the mirror 41 fixed to the first member 46 or the second member 47, which makes it possible to convert the displacement caused by thermal expansion in the optical axis direction to the displacement in the in-plane direction, and measure the displacement drift of the convex mirror 16 which undergoes large temperature change. Therefore, the prediction accuracy of focus drift can be enhanced.

Although the embodiments of the present disclosure have been described above, the present disclosure includes appropriate modifications without impairing its purpose and advantages, and is not limited by the above embodiment.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An optical apparatus comprising:
   a detector configured to detect reflected light of illumination light reflected by a sample;
   an optical system configured to illuminate the sample with the illumination light and guiding the reflected light reflected by the sample to the detector;
   a displacement measurement unit configured to measure a displacement drift indicating an amount of drift in position of an optical element included in the optical system; and
   a processing apparatus configured to store a correlation between the displacement drift and a focus drift indicating an amount of drift in distance between the sample and the optical system when the reflected light detected by the detector is brought into focus and configured to predict the focus drift from the measured displacement drift by using the correlation.

2. The optical apparatus according to claim 1, wherein the displacement drift indicates the amount of drift of the optical element from a reference position, and
   the focus drift indicates the amount of drift from a reference distance serving as a reference between the sample and the optical system.

3. The optical apparatus according to claim 1, wherein the displacement measurement unit comprises:
   a mirror fixed to the optical element;

a laser configured to emit laser light; and an interferometer configured to detect a position of the mirror from interference between the laser light emitted to the mirror and the laser light reflected by the mirror.

4. The optical apparatus according to claim 3, wherein the optical system includes a Schwarzschild optical system having a concave mirror and a convex mirror, the convex mirror is fixed to a holder including a first member extending in a first direction parallel to an optical axis of the convex mirror and a second member extending in a second direction perpendicular to the optical axis, the mirror is fixed to the optical element via the second member, and the displacement measurement unit measures the position from interference between laser light emitted along the second direction and the laser light reflected in a direction opposite to the second direction by the mirror.

5. The optical apparatus according to claim 1, wherein the processing apparatus is further configured to control a distance between the sample and the optical system based on the predicted focus drift.

6. A focus correction method for an optical apparatus comprising a detector configured to detect reflected light of illumination light reflected by a sample, and an optical system configured to illuminate the sample with the illumination light and guiding the reflected light reflected by the sample to the detector, comprising the steps of:

storing a correlation between a displacement drift indicating an amount of drift in position of an optical element included in the optical system, and a focus drift indicating an amount of drift in distance between the sample and the optical system when the reflected light detected by the detector is brought into focus;

measuring the displacement drift; and predicting the focus drift from the measured displacement drift by using the correlation.

7. The focus correction method according to claim 6, wherein the displacement drift indicates the amount of drift of the optical element from a reference position, and the focus drift indicates the amount of drift from a reference distance serving as a reference between the sample and the optical system.

8. The focus correction method according to claim 6, wherein the optical apparatus further comprises a displacement measurement unit, the displacement measurement unit includes:

a mirror fixed to the optical element;

a laser configured to emit laser light; and an interferometer configured to detect a position of the mirror from interference between the laser light emitted to the mirror and the laser light reflected by the mirror, and in the step of measuring the displacement drift, the displacement drift is measured by detecting a position of the mirror from interference between the laser light emitted to the mirror and the laser light reflected by the mirror.

9. The focus correction method according to claim 8, wherein the optical system comprises a Schwarzschild optical system having a concave mirror and a convex mirror, the convex mirror is fixed to a holder including a first member extending in a first direction parallel to an optical axis of the convex mirror and a second member extending in a second direction perpendicular to the optical axis, the mirror is fixed to the optical element via the second member, and in the step of measuring the displacement drift, the position is measured from interference between laser light emitted along the second direction and the laser light reflected in a direction opposite to the second direction by the mirror.

10. The focus correction method according to claim 6, further comprising a step of controlling the distance based on the focus drift predicted in the step of predicting the focus drift.

* * * * *